(12) United States Patent
Bohannon, Jr. et al.

(10) Patent No.: US 7,591,438 B2
(45) Date of Patent: Sep. 22, 2009

(54) ICE SHAVER/BLENDER CONTROL APPARATUS AND METHOD

(75) Inventors: John Robert Bohannon, Jr., Richmond, VA (US); Brian Paul Williams, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 11/119,205

(22) Filed: Apr. 29, 2005

(65) Prior Publication Data

US 2006/0202070 A1 Sep. 14, 2006

Related U.S. Application Data

(63) Continuation-in-part of application No. 11/074,896, filed on Mar. 8, 2005.

(51) Int. Cl.
B02C 25/00 (2006.01)
(52) U.S. Cl. .......................... 241/30; 241/36
(58) Field of Classification Search .............. 241/30, 241/DIG. 7, 199.12, 282.1, 33–37, DIG. 17; 99/348, 342, 468, 510, 275; 366/206
See application file for complete search history.

(56) References Cited

U.S. PATENT DOCUMENTS

| | | |
|---|---|---|
| 4,002,891 A | 1/1977 | Porter |
| 4,276,750 A | 7/1981 | Kawasumi |
| 4,295,420 A | 10/1981 | Satake et al. |
| 4,527,904 A | 7/1985 | Weetman |
| 4,568,193 A | 2/1986 | Contri et al. |
| 4,568,196 A | 2/1986 | Hacheney |
| 4,668,096 A | 5/1987 | Saaty |
| 4,681,030 A | 7/1987 | Herbert |
| 4,747,690 A | 5/1988 | Hayashi |
| 4,790,665 A | 12/1988 | Hayashi |
| 5,156,867 A | 10/1992 | Leuthold et al. |
| 5,156,868 A | 10/1992 | Muntener et al. |
| 5,200,220 A | 4/1993 | Capodieci |
| 5,332,588 A | 7/1994 | Capodieci |
| 5,347,205 A | 9/1994 | Piland |
| 5,380,086 A | 1/1995 | Dickson |

(Continued)

FOREIGN PATENT DOCUMENTS

EP 1 269 899 1/2003

OTHER PUBLICATIONS

PCT Search Report and Written Opinion; Application No. PCT/US2006/008236; Mailing date Sep. 20, 2007.

(Continued)

*Primary Examiner*—Faye Francis
(74) *Attorney, Agent, or Firm*—Thomas, Raring & Teaque, P.C.

(57) ABSTRACT

An ice shaver/blender control apparatus and method includes monitoring the operation of a blender motor as a measure of monitoring the quality and results of blending. By connecting a feedback sensor to the motor, it is possible to determine whether a blend process is complete. It is also possible to identify when cavitation is occurring or about to occur. In another aspect, the blender controls are directed to an improved method for portion blending. The method includes a two-step query to the user to determine both a predetermined portion size and the number of portions to be blended.

30 Claims, 11 Drawing Sheets

U.S. PATENT DOCUMENTS

| | | |
|---|---|---|
| 5,472,273 A | 12/1995 | Fowler et al. |
| 5,481,968 A | 1/1996 | Clem |
| 5,513,912 A | 5/1996 | Lotz et al. |
| 5,556,198 A | 9/1996 | Dickson, Jr. et al. |
| 5,619,901 A | 4/1997 | Reese et al. |
| 5,960,701 A | 10/1999 | Reese et al. |
| 5,967,021 A | 10/1999 | Yung |
| 6,029,568 A | 2/2000 | Pascotti et al. |
| 6,194,013 B1 | 2/2001 | Kolar et al. |
| 6,342,260 B2 | 1/2002 | Kolar et al. |
| 6,364,522 B2 | 4/2002 | Kolar et al. |
| 6,402,365 B1 | 6/2002 | Wong |
| 6,446,547 B2 | 9/2002 | Kubicko et al. |
| 6,609,821 B2 | 8/2003 | Wulf et al. |
| 6,632,013 B2 * | 10/2003 | Wulf et al. ............. 366/199 |
| 6,656,515 B2 | 12/2003 | Lowry et al. |
| 6,679,820 B2 | 1/2004 | Barkus et al. |
| 6,759,072 B1 | 7/2004 | Gutwein et al. |
| 7,290,724 B2 | 11/2007 | Lin et al. |
| 2001/0028913 A1 | 10/2001 | Kolar et al. |
| 2002/0009017 A1 | 1/2002 | Kolar et al. |
| 2002/0048626 A1 | 4/2002 | Miller et al. |
| 2002/0126570 A1 | 9/2002 | Kamoshida et al. |
| 2002/0141286 A1 | 10/2002 | Wulf et al. |
| 2002/0176320 A1 | 11/2002 | Wulf et al. |
| 2003/0142581 A1 * | 7/2003 | Barton et al. ............. 366/142 |
| 2003/0193833 A1 | 10/2003 | Wulf et al. |
| 2003/0213373 A1 | 11/2003 | Dickson, Jr. |

OTHER PUBLICATIONS

UK Search Report. Application No. GB0604366 5. Jul. 6, 2006.

Notification of Transmittal of the International Search Report and the Written Opinion of the International Searching Authority. or the Declaration. International Application No. PCT/US06/08236. Mar. 6, 2006.

Japanese patent application, Serial No. JP06-205729A; Publication Date Jul. 26, 1994 5 pages.

Translation of Japanese patent application; Serial No. JP06-205729A; Publication Date Jul. 26, 1994 5 pages.

* cited by examiner

ICE SHAVER/BLENDER CONTROL APPARATUS AND METHOD

This application is a continuation-in-part of U.S. application Ser. No. 11/074,896, filed Mar. 8, 2005.

The present invention is directed to an electronic control system for use with blenders. In one example, the system has a feedback sensor connected to a blender motor to regulate blending performance. In another example, the system includes a simplified user input method for effective portion blending. The present invention may further be effectively incorporated into a combination ice shaver/blender system.

BACKGROUND

Blender users desire greater functionality from blenders. Domestic and commercial blenders process and blend a broad range of food and beverage materials. Some of the beverage materials include dairy products (e.g., milkshakes), smoothies (with, e.g., frozen fruit), and frozen cocktails (e.g., daiquiris and margaritas). The different materials to be blended have different blend characteristics. For instance, some of the materials are easy to blend and blend quickly, while other materials are very hard or lack homogeneity and are very difficult to process and blend.

Some advanced blenders in the art may be programmed for different uses. Typically, a blender program will include several cycles that vary the blend speed and time of blend in an effort to obtain various results. Because existing blenders operate without feedback and therefore without regard for their efficiency, they may over-blend or under-blend material. Over-blending or under-blending may be caused by user error or by variations in batches of material being processed and blended. Over-blending results in a watery end product, while under-blending may result in a chunky end product. The broad range of material users desire to blend makes difficult a consistent textured drink.

Another common problem with conventional blenders is their propensity to cavitate. Many times when aggressive media is added to a drink, a gas pocket will form in the mix between the cutter assembly and the material to be blended. The gas bubble between the material and the cutter assembly causes the material to fail to be blended by the blades, thus disrupting and reducing blend performance. This type of impairment of function is called cavitation. Cavitation is typically remedied by allowing the blender to continue operating until the pocket ruptures (as a result of vibration and/or melting of ingredients). Alternatively, the container may be shaken to loosen the mix and dislodge the gas pocket so the material to be blended can be worked by the cutter assembly.

A still further issue of blender operation concerns the programmability of blender cycles, particularly in a commercial setting. There is a lot of interest in blenders having programmability so that a user may touch a single button to actuate the blender. The blender then automatically runs a predetermined cycle. However, this single button programmability requires knowledge of the buttons—that is, which is the right button for blending the right drink. The determination of the right button also varies with respect to the number of portions being blended. Portion blending is not usually solved by merely lengthening a blend cycle by a whole number multiple of the number of portions desired.

There are also blending issues with the specific class of appliances that shave ice and then blend ingredients with the shaved ice. Current shaver/blenders may incorporate sophisticated programmability similar to that discussed earlier herein. There remain, however, challenges with respect to a user having to remember all of the choices embodied in the programmable buttons and especially when compounded with the problem of also factoring in the number of portions being shaved and blended. Many ice shaver/blenders, in addition to the blending challenges and shortcomings described herein, have the further issue of shaving accurate and consistent amounts of ice before even reaching the full blending stage. For instance, ice shavers based on specifically timed shaving or specific weight of shaved product may in fact cause variable amounts of ice to actually be shaved. These potential inconsistencies only exacerbate the blending issues already described herein.

SUMMARY

Accordingly, it is an object of the present invention to overcome the foregoing drawbacks with existing blender control systems. A feedback sensor may be operatively connected to a blender motor, jar pad or any component between, near or part of the motor and blender container to detect an attribute associated with the operation of the motor. By monitoring that operation and controlling the motor based on that feedback, a consistent, blended product may be obtained and cavitation may be minimized. Additionally, effective portion blending may be obtained through a two-step user query that allows for the user to input the type of drink and then the number portions in order to actuate a blend cycle that is predetermined for that specific purpose.

In one example, an electronic blender control system for producing a consistent, blended material comprises a blender assembly comprising a blender motor operatively connected to a cutter assembly, wherein the cutter assembly is mounted in a blender jar for blending material placed within the jar. An energy control switch activates and controls the amount of energy delivered to the motor during operation of the motor. A feedback sensor is electrically connected to the energy control switch, wherein the feedback sensor is adapted to detect an attribute associated with the operation of the motor and send a signal to the energy control switch based on the attribute detected. The attribute detected may include revolutions per minute of the blender motor, the amount of power used by the motor, or the amount of torque exerted, or the vibration on the motor during operation. A signal may be sent to the energy control switch when the attribute detected reaches or exceeds a predetermined amount. The signal that is sent may be a command to reduce the amount of energy delivered to the motor, which may be, for example, a command that substantially zero energy be delivered to the motor.

In another example, an electronic blender anticavitation control system comprises a blender assembly comprising a blender motor operatively connected to a cutter assembly, wherein the cutter assembly is mounted in a blender jar for blending material placed within the jar. An energy control switch activates and controls the amount of energy delivered to the motor during operation of the motor. A feedback processor comprises a feedback sensor electrically connected to the energy switch, wherein the feedback sensor is adapted to detect an attribute associated with the operation of the motor and send a signal to the energy control switch based on the attribute detected. The feedback processor is adapted to analyze the attribute information detected by the feedback sensor, and when the processor determines that cavitation is occurring, it sends a signal to the energy control switch to change the amount of energy delivered to the motor. The signal sent to the energy control switch may be a command to reduce or substantially shut off the energy delivered.

In another example, a method of controlling blender operation to produce a consistent, blended material comprises the steps of providing (a) a blender assembly comprising a blender motor operatively connected to a cutter assembly, wherein the cutter assembly is mounted in a blender jar for blending material placed with the jar; (b) an energy control switch that activates and controls the amount of energy delivered to the motor during operation of the motor; and (c) a feedback sensor electrically connected to the energy control switch, wherein the feedback sensor is adapted to detect an attribute associated with the operation of the motor and send a signal to the energy control switch based on the attribute detected. The method further comprises the step of adding material to the blender jar and activating the blender motor. The signal from the feedback sensor to the energy switch is recorded at predetermined time intervals and the signals are compared over time. The blender motor is deactivated when a predetermined relationship is found in the signals recorded from the feedback sensor.

In a still further example, a method of reducing cavitation in a blender comprises the steps of providing (a) a blender assembly comprising a blender motor operatively connected to a cutter assembly, wherein the cutter assembly is mounted in a blender for blending material placed with the jar; (b) an energy control switch that activates and controls the amount of energy delivered to the motor during operation of the motor; and (c) a feedback processor comprising a feedback sensor electrically connected to the energy control switch, wherein the feedback sensor is adapted to detect an attribute with the operation of the motor and send a signal to the energy control switch based on the attribute detected. The method further includes adding material into the blender jar and activating the blender jar. The method includes recording the signal from the feedback sensor at predetermined time intervals and analyzing the signal over time in determining when cavitation is occurring. When cavitation is occurring, the method includes sending a signal to the energy control switch to reduce the power to the blender motor for a predetermined time period, and then increasing the energy to the blender motor at the end of the predetermined time period. Alternatively, when cavitation is occurring, the method includes sending a signal that actuates another method, such as inducing vibration, that reduces or eliminates cavitation.

In a still further example, a method of blending a material comprises providing a blender assembly comprising a blender jar and a blender motor operatively connected to a cutter assembly mounted in the blender jar. The method includes providing a user interface operatively connected to the blender motor and displaying on the user interface a plurality of first selection choices corresponding to predefined blender cycles. The method includes selecting a predefined blender cycle. Still further, the method includes displaying on the user interface a plurality of second selection choices corresponding to a number of portions of material to be blended, and then selecting the number of portions of material to be blended. The predefined blender cycles may correspond to different types of drinks. The portions of material may correspond to the number of drinks to be served from the blended material.

In a further alternative, a method of controlling operation of an ice shaver/blender to produce a consistent, blended material includes the steps of providing an ice shaver assembly comprising an ice hopper and ice agitator that is connected to and rotatably driven by a shaver motor, a blade mounted adjacent the ice agitator and a shaved ice chute adapted to dispense shaved ice into a blender jar. The method further includes providing a blender assembly comprising the blender jar and a blender motor operatively connected to a cutter assembly, wherein the cutter assembly is mounted in the blender jar for blending material placed within the jar, an energy control switch that activates and controls the amount of energy delivered to the blender motor during operation of the motor, and a feedback sensor electrically connected to the energy control switch. The feedback sensor is adapted to detect an attribute associated with the operation of the blender motor and send a signal to the energy control switch based on the attribute detected. The method further includes adding ice into the ice shaver, activating the ice shaver to shave and dispense ice into the blender jar, adding material to the blender jar, activating the blender motor, recording the signal from the feedback sensor to the energy control switch at predetermined time intervals, and comparing the signals over time, and finally deactivating the blender motor when a predetermined relationship is found in the comparison of signals recorded from the feedback sensor. The ice shaver may further comprise a rotation sensor for detecting the number of revolutions of the ice agitator. The step of activating the ice shaver motor may further comprise detecting the number of revolutions of the ice agitator and deactivating the shaver motor after a predetermined number of revolutions of the ice agitator.

In another example, a method of operating an ice shaver blender includes providing an ice shaver assembly comprising an ice hopper, an ice agitator that is connected to and rotatably driven by a shaver motor, a blade mounted adjacent the ice agitator, and a shaved ice chute adapted to dispense shaved ice into a blender jar. The method further includes providing a blender assembly comprising the blender jar and a blender motor operatively connected to a cutter assembly mounted in the blender jar. A user interface is operatively connected to the blender motor and displays a plurality of first selection choices corresponding to predefined blender cycles and a plurality of second selection choices corresponding to a number of portions of material to be blended. The method further includes selecting a predefined blender cycle and a number of portions of material to be blended.

DETAILED DESCRIPTION

The present invention is directed to blender controls alone and in combination with an ice shaver/blender assembly. The blender control apparatuses and methods include monitoring the operation of a blender motor as a measure of monitoring the quality and results of blending. By connecting a feedback sensor to the motor, jar pad or any component in between, near or part of the motor and blender container, it is possible to determine whether a blend process is complete. It is also possible to identify when cavitation is occurring or about to occur. The feedback sensor may then be used to shut down or modify the operation of the blender. In this way, there is no over blending or under blending of the material. There is also a reduction and minimization of cavitation during blending.

Another aspect of the controls herein is an improved method for portion blending and portion shaving/blending. The portion blending method includes a two-step query to a user to determine both a predetermined blender cycle and the number of portions to be blended. Either the blender cycle or the number of portions may be selected first. In either event, the result is a two-step path to identify and set in motion a predefined blender cycle appropriate to the amount of material and type of material being blended or shaved and blended. While all of the cycles are predefined, the method allows for an intuitive and simple way to initiate the operation of the blender or ice shaver/blender.

The present invention is applicable to conventional blender assembly constructions that stand alone or that may be used with an ice shaver/blender assembly. The blender assembly has a blender motor operatively connected to a cutter assembly. The cutter assembly is mounted in a blender jar for blending material placed within the jar. The blender motor is activated and controlled by an energy control switch. The switch controls the amount of energy delivered to the motor during operation of the motor. The switch is typically a multiple speed or continuously variable speed switch so that different speeds of the cutter assembly (revolutions per minute—RPM's) are available for different blending jobs.

A feedback sensor is electrically connected to the energy control switch. The feedback sensor is connected to the motor, mounted proximate the motor, or mounted anywhere in the blender assembly including the motor mount, jar and jar pad. The sensor is adapted to detect an attribute associated with the operation of the motor and send a signal to the energy control switch based on the attribute detected. The operation of the sensor is described further with reference to FIGS. 1-4. The use of the sensor is described in terms of an automatic blend concept and an anticavitation control concept. All of these examples are based on the monitoring of the operation of the blender motor. The feedback from the motor is used to obtain a consistent, textured blended product.

When a drink is blended in a blender, there is a common cycle that the blender follows as the drink is blended. A blender will start out at a lower RPM and slowly climb in speed until it reaches a maximum RPM as dictated by the viscosity of the mixture. This ramp will climb faster or slower depending on the media in the blender and how long it takes to break it down into a homogeneous mixture. There is also a fluctuation in speed as the cutter assembly portion of the unit impacts the media. This fluctuation will lower as the media is broken down.

An alternate way of looking at this is through, for instance, the power, vibration or torque of the motor. At the beginning of the blend cycle each of these items is relatively much higher as the media has not been broken down. The quantitative measurements associated with these motor operation attributes will slowly decrease and finally stabilize as the mixture becomes more homogeneous.

Many times in the busy environment in which blenders are used, drinks are over blended as the operator becomes distracted with other work as the mixture is blending. The result of this is a watery drink due to the extended blending time. The other extreme is when the operator is in a hurry and stops blending before the desired consistency is obtained. The resulting product can be overly chunky and inadequately mixed.

As noted earlier herein, and as shown in FIGS. 1 and 2, the idealized curves of RPM, power, vibration, torque and other measurable items related to blender motor operation follow a similar or predictable path. Knowing these traits, it can theoretically be determined when blending of a mix is complete and the cycle can be stopped. This is also applicable to the texture (particle size) as it can be determined when to stop the unit for the preferred texture. Through monitoring any one, all or a number of these traits, it is possible to adjust the blender to stop when a desired texture has been obtained. By monitoring and recording the traits, the signal can be compared to a past signal or signals from the motor operation. A predetermined relationship, as previously described herein, can be found in the comparison of signals. Once the predetermined relationship is detected, the blender motor can be deactivated. One predetermined relationship is substantial identicality in the signal recorded from the feedback sensor which indicates a homogenous mixture in the blender jar.

Many times, and especially when aggressive media is added to a drink, a gas pocket will form in the mix which is called cavitation. This is typically remedied by allowing the blender to continue blending until the pocket ruptures (due to vibration and melting of the material) or the container is shaken to loosen the mix.

When cavitation occurs, the media in the material to be blended quickly loses contact with the blades as a result of the gas pocket that is formed. When this occurs, the RPM quickly rise on the motor and the power/torque/vibration associated with the motor quickly drops along with other measurable items. Knowing these traits allows an easy way to monitor when cavitation occurs. When cavitation starts to form in the media, the blender speed is adjusted to minimize or eliminate it. Once the cause of the cavitation is solved, the speed of the blender motor is allowed to return to normal to complete the normal cycle. By detecting when cavitation is occurring or about to occur, and further by modifying motor operation, the blend time can be minimized and no operator intervention is needed.

One method of measuring these traits is by monitoring RPM with a Hall effect sensor and a (single/multi) poled magnet. Initially, when the media has not been broken down, the speed of the motor will be erratic, varying up and down as the blades impact the media in the jar. As the media is broken down, this speed will become more and more consistent. This "variation" of speed could be used to determine how far the media has been broken down. By monitoring and recording the variation of speed, the sensor can stop the blending at the desired texture. This technique could also be used to determine the progress of blending and make adjustments to a predefined cycle. For instance, if more media was added mid-cycle, the energy control switch would detect more variation and continue blending until the variation lowers to the desired or target levels. A Hall effect sensor is only one of many ways to detect these blending characteristics.

Just as using the feedback sensor simplifies the blending process for a user, an improved user interface facilitates accurate portion blending. The term "portion blending" is a general term referring to the selection by a user of a certain number of portions of a material to be blended. The blender assembly that is able to use the improved interface as described herein is generally a blender assembly having a blender jar and a blender motor operatively connected to a cutter assembly that is mounted in the blender jar. A user interface is operatively connected to the blender motor. The user interface includes a plurality of first selection choices that correspond to predefined blender cycles. The user interface also includes a plurality of second selection choices that correspond to a number of portions of material that may be blended. The user merely selects a predefined blender cycle and a number of portions to be blended, and then the blender control activates a predetermined cycle that is for the purpose of blending that specific material.

Figure 1:
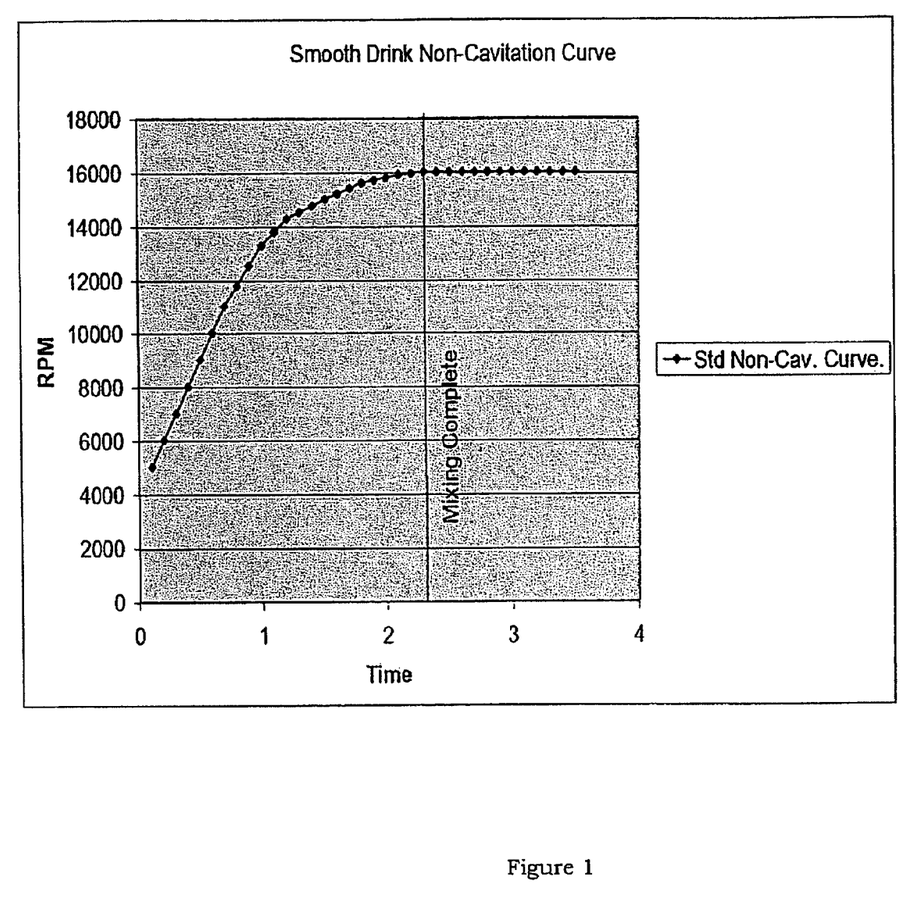
FIG. 1 is a graph showing an idealized smooth drink non-cavitation curve with respect to the operation of a blender when comparing RPM versus time.
Figure 2:
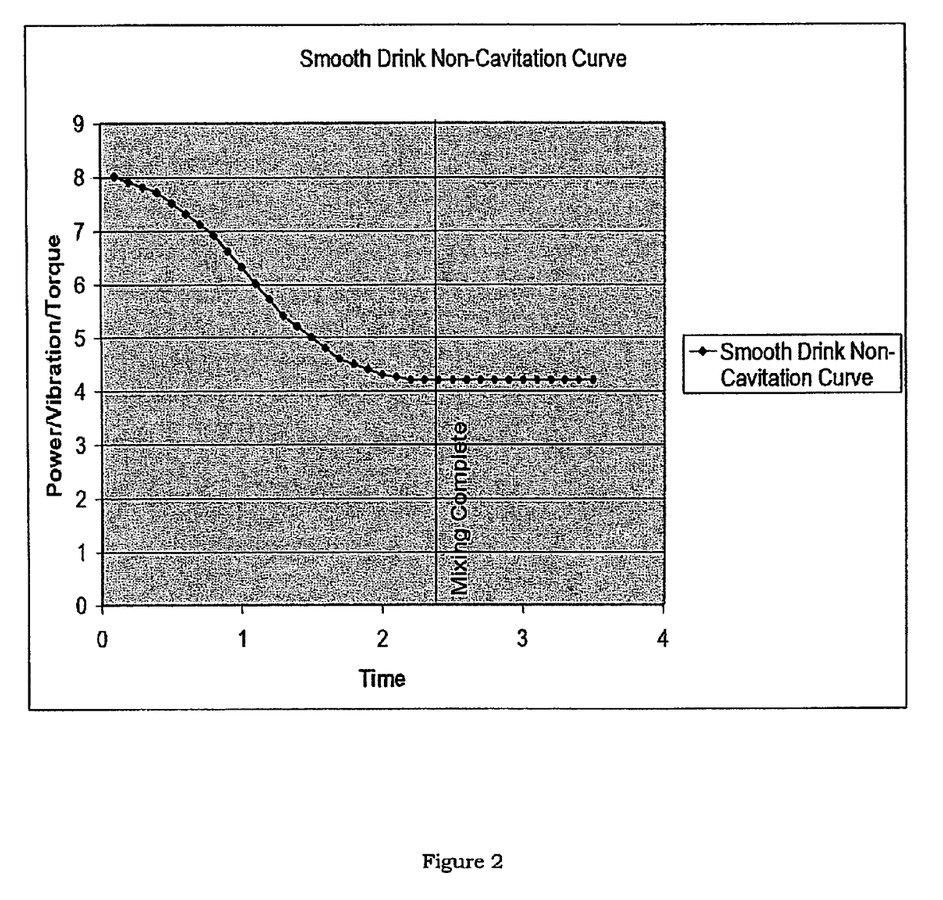
FIG. 2 is an idealized smooth drink non-cavitation curve with respect to the operation of a blender when comparing power, vibration, or, alternatively torque versus time.
Figure 3:
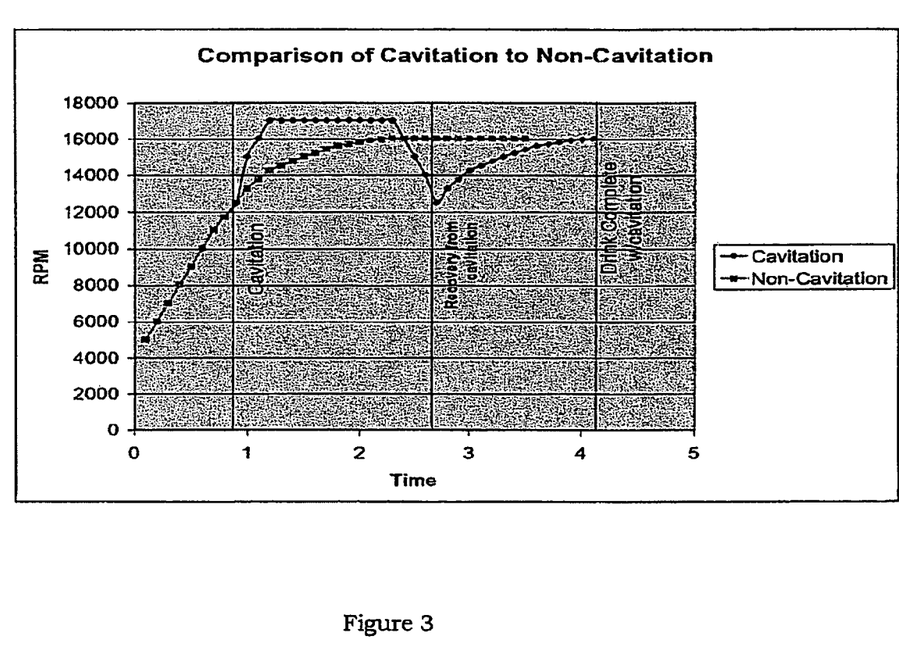
FIG. 3 is a curve showing a comparison of the cavitation curve versus a non-cavitation curve.
Figure 4:
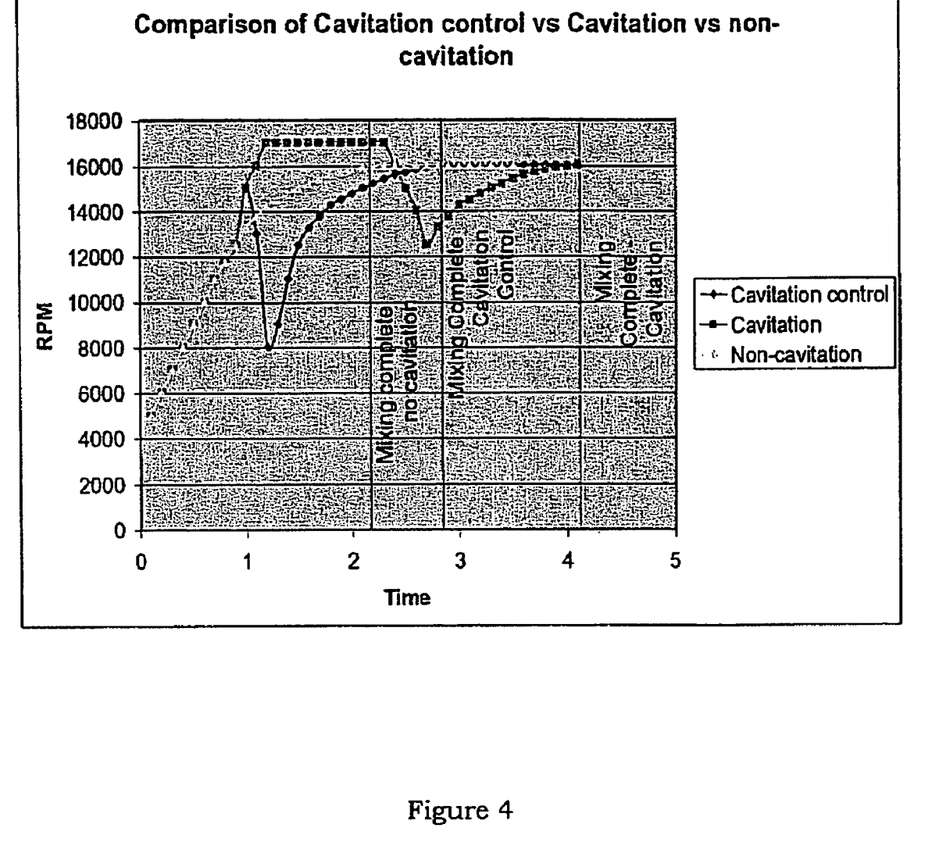
FIG. 4 shows a comparison of a cavitation control system versus cavitation versus a non-cavitation curve as compared in RPM verses time.
Figure 5:
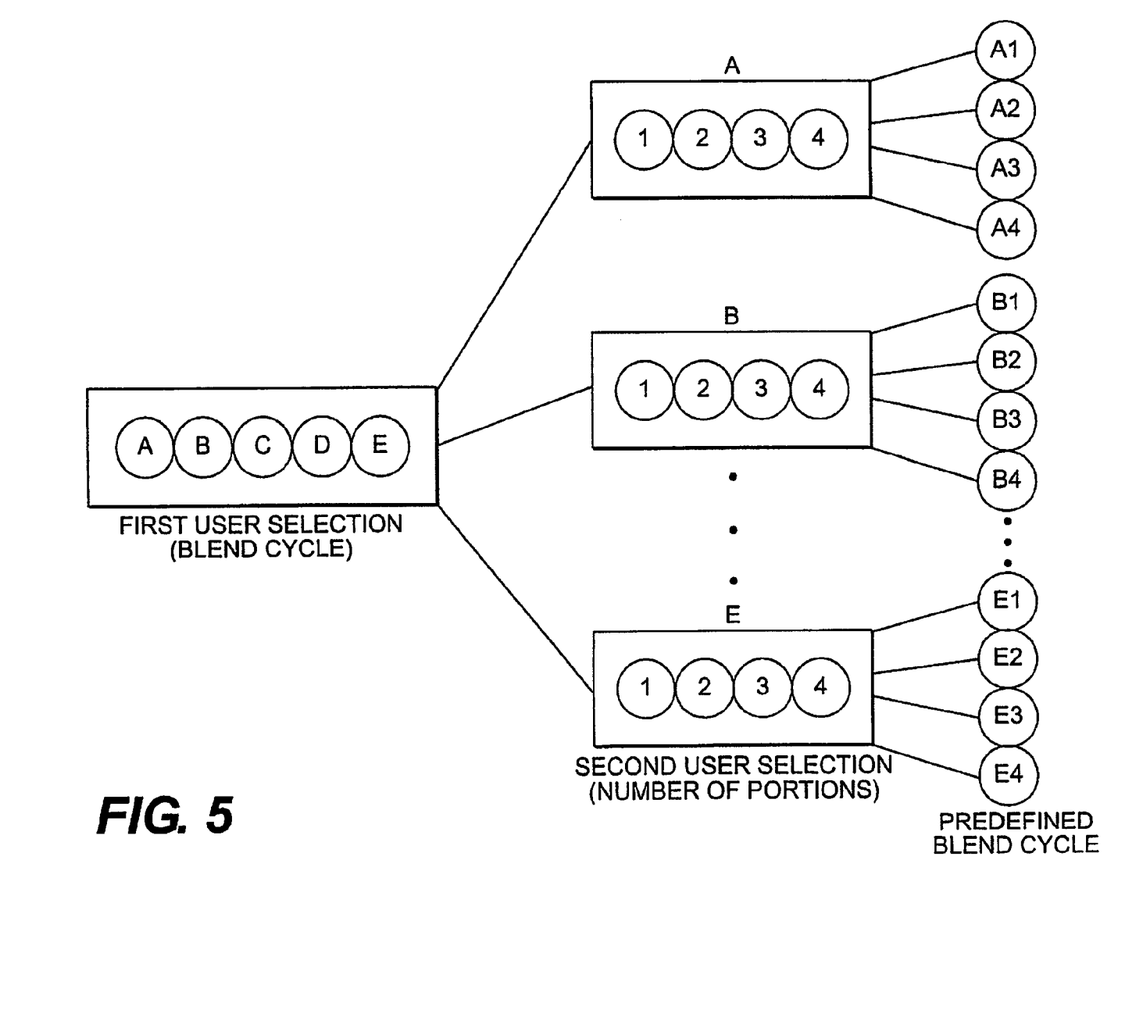
FIGS. 5 and 6 are flow charts demonstrating the operation of a user interface to obtain improved portion blending.

With reference to FIG. 5, a user makes a first selection of a specific blender cycle. No graph or other indication of specific power versus time is usually shown. Instead, the user merely selects a type of material to be blended or an intended type of mixed drink or (in the case of a shaver/blender) the portion size—for example, a daiquiri, margarita, smoothie, 12 oz., 16 oz., etc. Then, because the size of batch is important for a blending cycle when defining an appropriate cycle, the number of portions is entered by the user. Usually, the number of portions will indicate or will be proportional to the number of drinks to be served by the blended material. In FIG. 5, the first selection is the specific blender cycle and the second selection is the number of portions. Of course, this order could be reversed.

Figure 6:
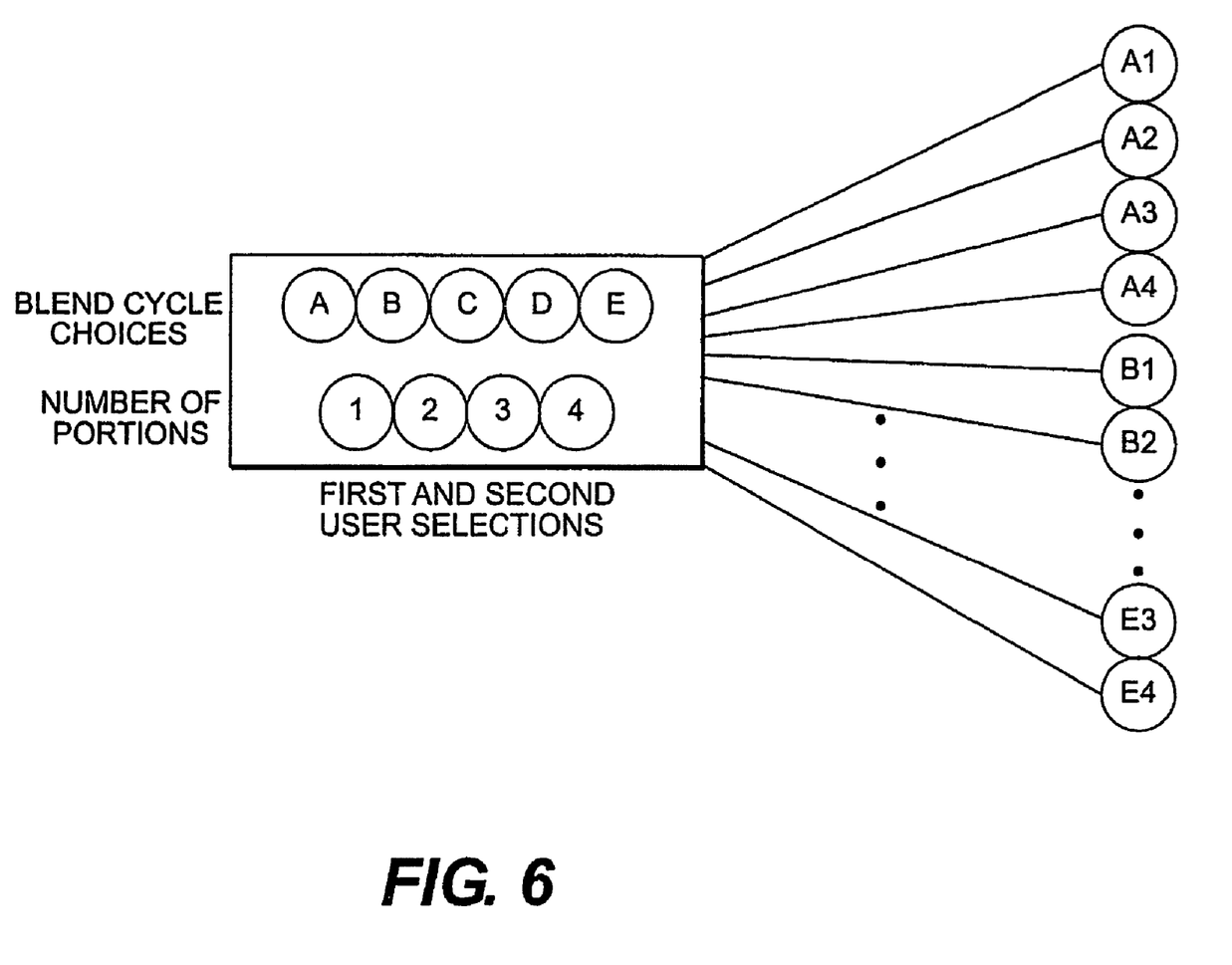

Still further alternatively, as shown in FIG. 6, the user interface may display a selection of both the type of blender cycle and the number of portions. In that example of FIG. 6, the blender would not activate until both a blender cycle and a number or portions is selected. Once each is selected, then a predefined blend cycle will be run on the blender. Or, alternatively, once each is selected, then a "start" button is pressed and a predefined blend cycle will run.

In each of the blend cycles chosen by the user, e.g., A1, A2, etc., the ultimate blend cycle can be a unique, predefined blend cycle. In the example of FIG. 5, therefore, twenty different unique blend cycles can be chosen by the user in the two-step process described. In operation, each cycle may be custom tailored (predefined) for the specific drink and amount of drink being processed/blended. While it is possible that two or more of the specific blend cycles may actually be the same cycle, that is not necessary.

Also, it is desirable for a blender to retain in memory the last blend cycle. In this way, a user or blender operator can change zero, one or two of its specific blend operation choices before pressing a start key to begin the blend cycle. For instance, if a user is preparing the identical type of drink and number of portions as the last-completed batch, then the user can merely push the start button to activate the same blend cycle as before. Similarly, if just the type of drink or number of portions is different, then only that one choice can be changed.

As an alternative to creating and storing in memory individual and custom blend cycles, it is possible to use a drink indexing factor. Drink indexing is a technique of allowing each blend cycle to be "adjusted" for drink size (number of portions) through the use of a factor to multiply the blend cycle curve time values. This makes the blend cycle more efficient for multiple drinks/portions and saves computer memory space in programming by eliminating the requirement for separate, unique cycles corresponding to each different number of portions of drinks associated with a particular blend cycle. The way the drink indexing works is that the base drink cycle (typically corresponding to a class of drinks such as a daiquiri or a smoothie) is based on one drink/portion only. (Drink indexing could be based on any number, but a single drink/portion is simple and intuitive to work with.) A blend cycle is defined as a routine that a blender motor follows where the RPM varies over a predefined time period. During the blend cycle, there are points that the RPM is instructed to change by (1) remaining constant, (2) ramping at a certain rate, or (3) jumping (90° ramp) to a different speed. Each of these points in the blend cycle are modified by a drink index factor which basically multiplies the time for each portion of the cycle by a predetermined number.

Figure 7A:
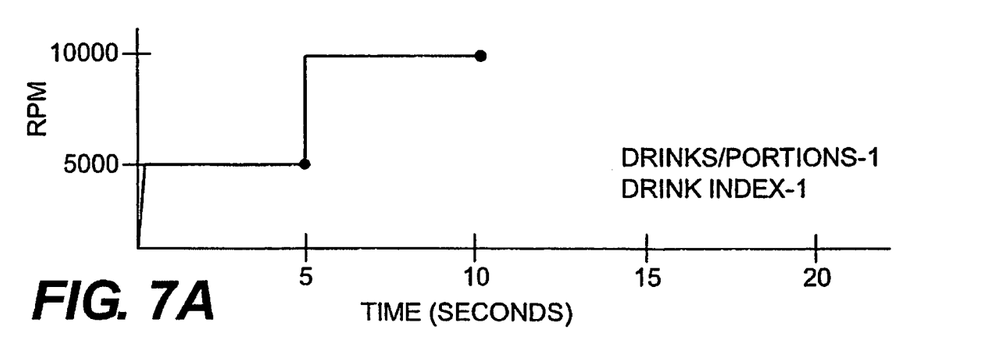
FIGS. 7A-D are graphs of an exemplary blend cycle that is modified by a predetermined drink index multiplier.
Figure 7B:
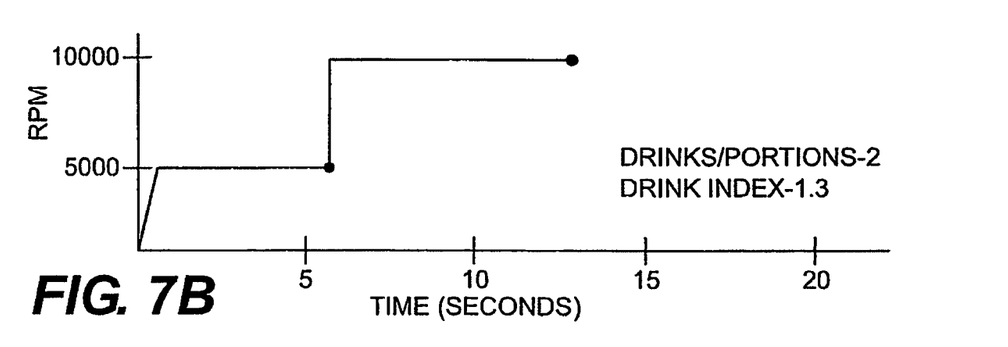
Figure 7C:
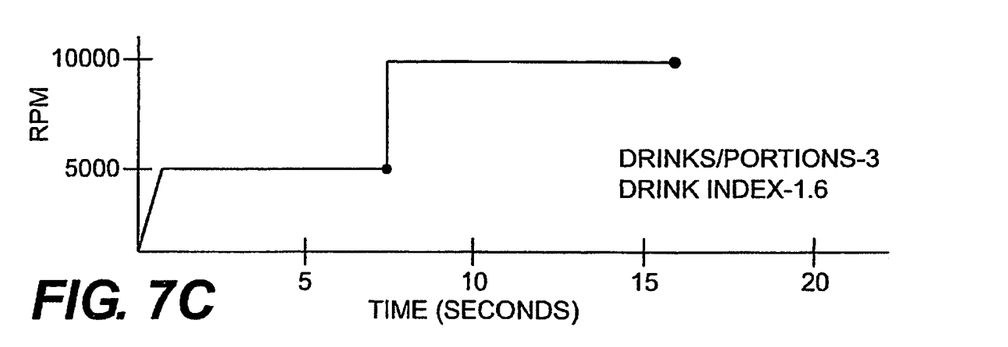
Figure 7D:
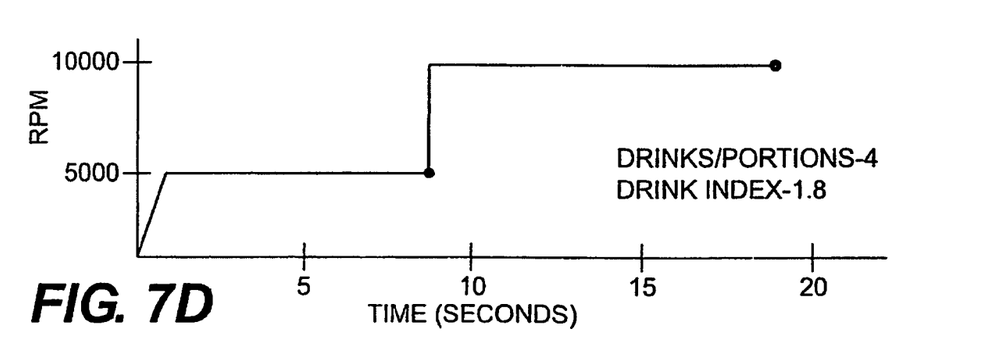

Referring now to FIGS. 7A-D, an example of a drink indexing program is demonstrated. In FIG. 7A, a simple blend cycle is illustrated for a single portion of a drink. The blend cycle in this hypothetical example consists of running at 5,000 RPMs for five seconds, and then jumping to 10,000 RPMs for five additional seconds. If a blender user were to select two drinks (two portions), and the drink index factor for two drinks was set at 1.3, then the cycle would be modified to operate the blender at 5,000 RPMs for 6.5 seconds, and then jumping up to 10,000 RPMs for 6.5 additional seconds. In this example, the RPM values are not affected. In other examples, the RPM value may also be indexed. As shown in FIGS. 7A through 7D, the drink index factor for two portions (FIG. 7A) is 1.3, three portions (FIG. 7C) is 1.6, and four portions (FIG. 7D) is 1.8.

Each blend cycle corresponding to different drink media could have different, predetermined drink index factors for any number of drinks assigned to them so that each drink has its own custom index. For instance, thicker drinks may need more time to blend multiple portions than thinner drinks. In other words, a smoothie may require more blend time than a daiquiri when multiplying the number of drinks. A selection of drink index factors will further vary depending on type of blender motor blender jar, cutter assembly, etc. The bottom line is that the selection of drink index factors is a subjective analysis that is predetermined and then preset into the blender unit.

Of course the blend cycle shown in FIGS. 7A-D is a very simple cycle used for demonstrative purposes only. Other cycles are known to those with skill in the art. The drink indexing feature can be applied just as well to these other cycles. Also, as noted, the drink indexing feature described herein is focused on the time of operation of the blender and each step in the blend cycle. The drink indexing may also additionally or alternatively be applied to the RPMs of a given blender.

Figure 8:
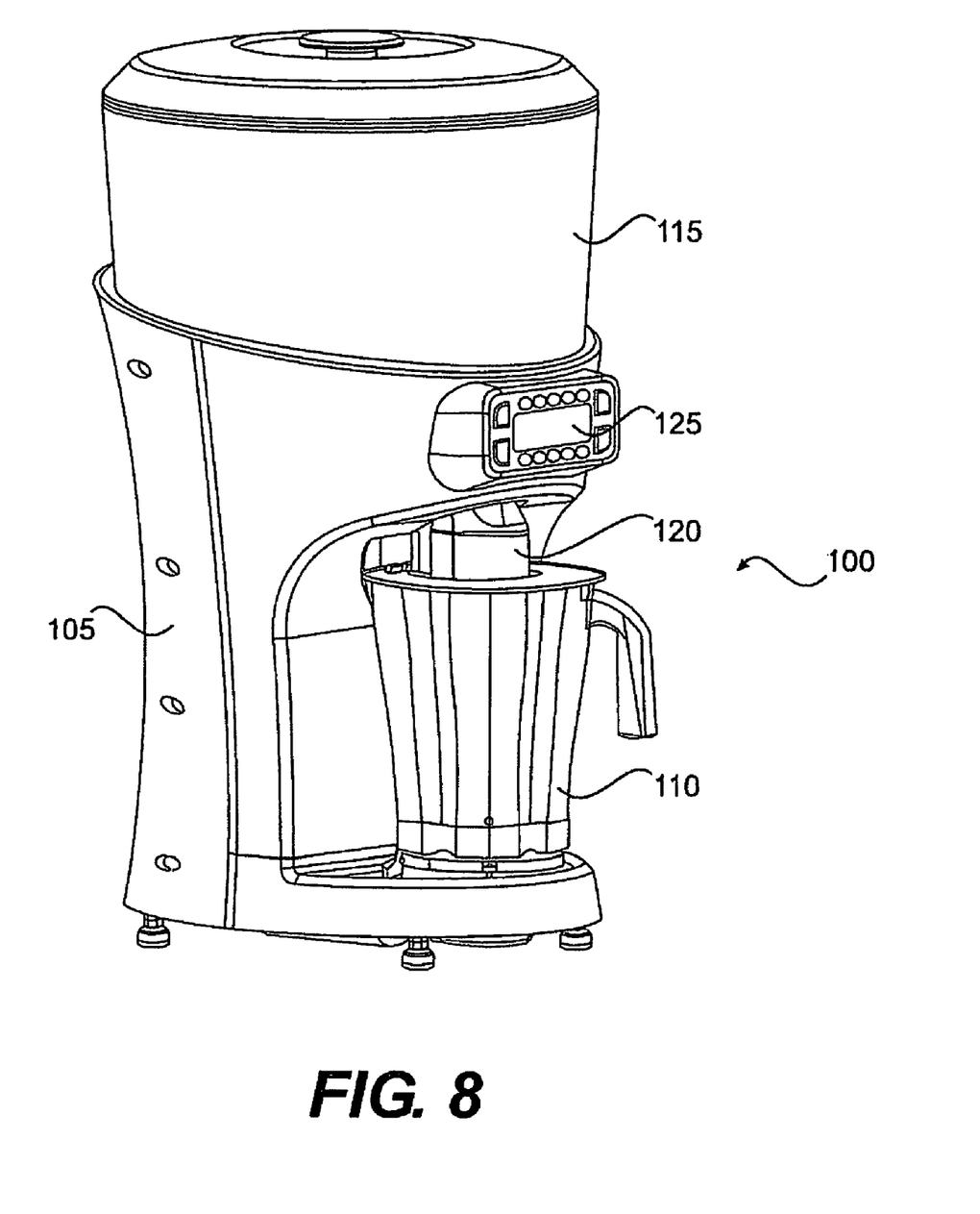
FIG. 8 is a perspective view of an ice shaver/blender assembly.
Figure 9:
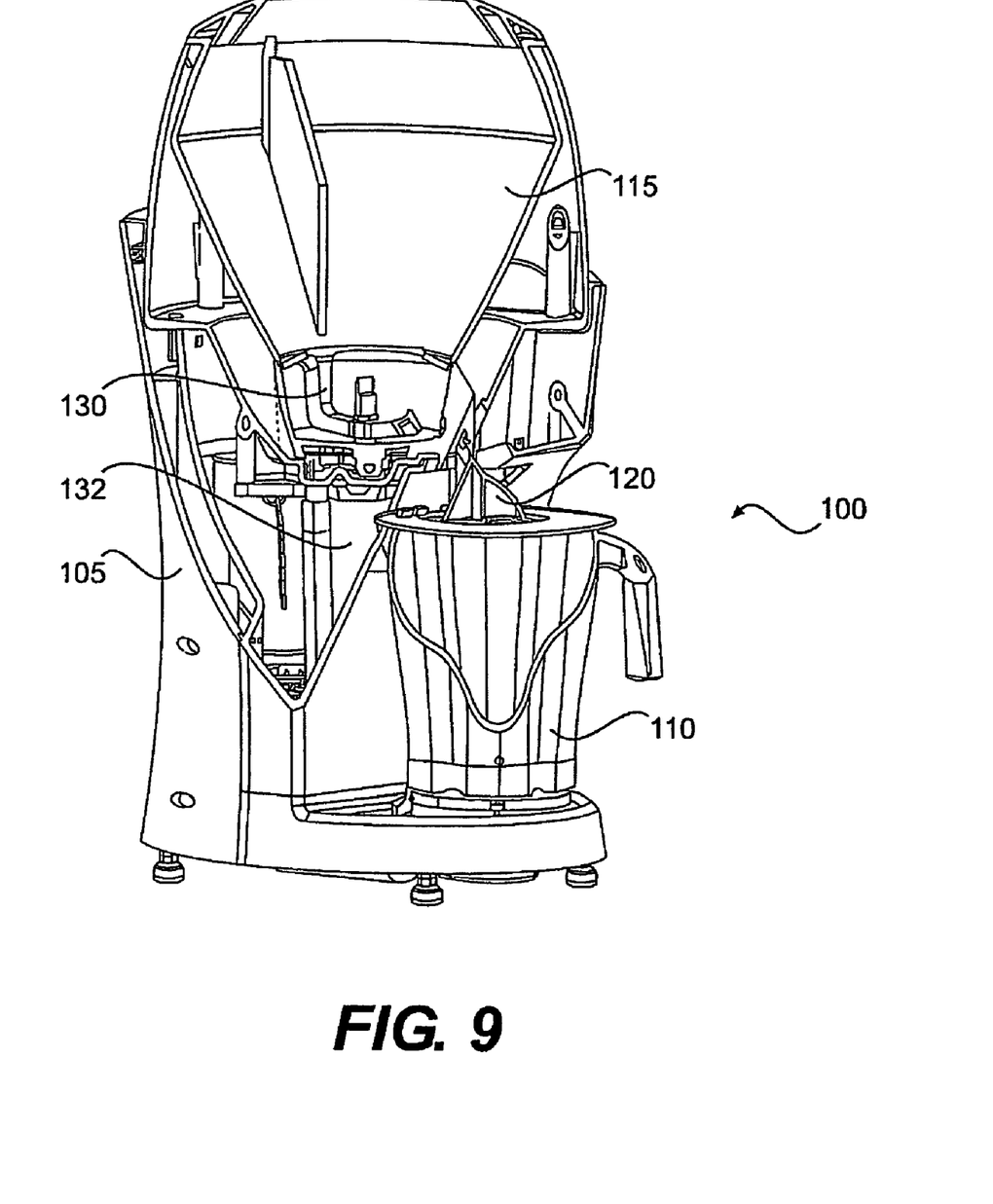
FIG. 9 is a partial cut-away view of the ice shaver/blender assembly shown in FIG. 8.
Figure 10:
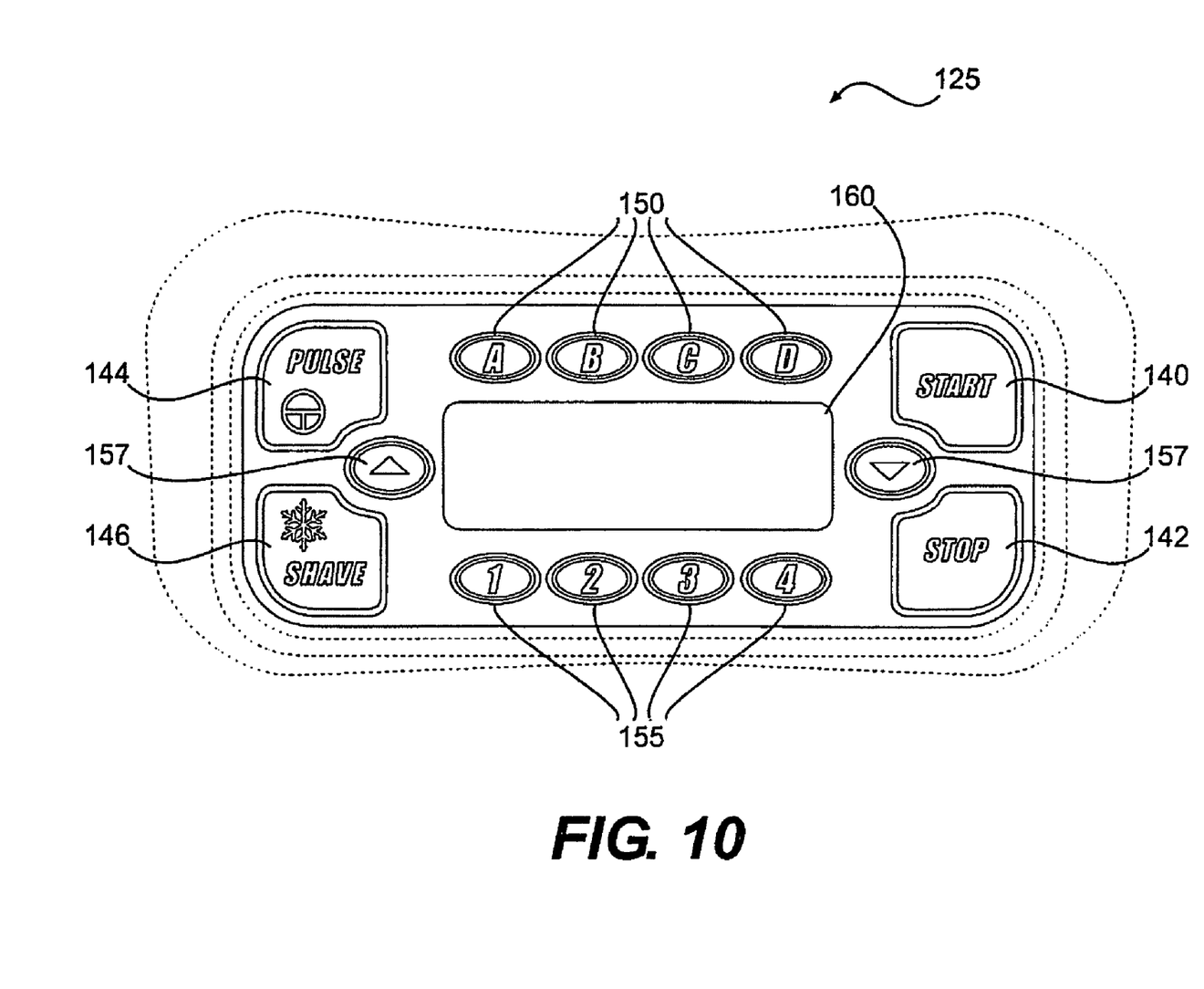
FIG. 10 is an exemplary user interface for an ice shaver/blender assembly.

Turning now to FIGS. 8-10, there is shown an ice shaver/blender assembly 100 and its user interface touch pad 125. The ice shaver/blender 100 includes a housing 105 on which is mounted a blender jar 110. A blender motor and blender jar pad are incorporated in the assembly 100 but are not shown in the figures. An ice hopper 115 is mounted on the top of the housing 105. The ice hopper 115 stores ice and makes it available to an ice shaving assembly inside the housing 105. The ice chute 120 dispenses the shaved ice into the blender jar 110.

Turning now specifically to FIG. 9, inside the housing 105 of the ice shaver/blender 100 there is an ice agitator assembly 130 configured at the bottom of the ice hopper 115. The ice agitator 130 is operatively connected to and rotated by shaver motor 132 that is mounted within the housing 105. The ice agitator 130 rotates and contacts ice with a stationary blade (not shown) mounted above the ice dispensing chute 120. The concept of a fixed blade and an ice agitator assembly generally are known to those of skill in the art. Of course, different ice shaver/blender assemblies may have different ice agitators and blade configurations engineered specially for them.

The user interface touch pad 125 is shown in detail in FIG. 10. The touch pad 125 includes start and stop buttons 140 and 142. It also includes a pulse button 144 to allow a user to manually accelerate the blender motor to drive the cutting action of the blender. The shave button 146 allows the user to independently initiate the ice shaver motor to shave and dispense shaved ice. Portion size selection buttons 150 allow the user to select a particular portion size for use. Each portion size selection, e.g., 12 oz., 16 oz., etc., will correspond to both the amount of ice shaved and the particular blend cycle of the blender. The number of portion user selection buttons 155 are selected to correspond to the number of portions desired by the user. Buttons 156 are diagnostics menu access keys.

In operation, ice is added into a the hopper 115 or is already stored there. The user adds drink ingredients into the blender jar 110. The drink ingredients may include various liquids, fruits, dairy products or other food products. The jar is placed onto the ice shaver/blender assembly 100 and below the ice chute 120. The user then selects a desired blend cycle using the blend cycle selection buttons 150. Then, the number of portions is selected by using the portion key buttons 155. The assembly is then started by using the start button 140.

Figure 11:
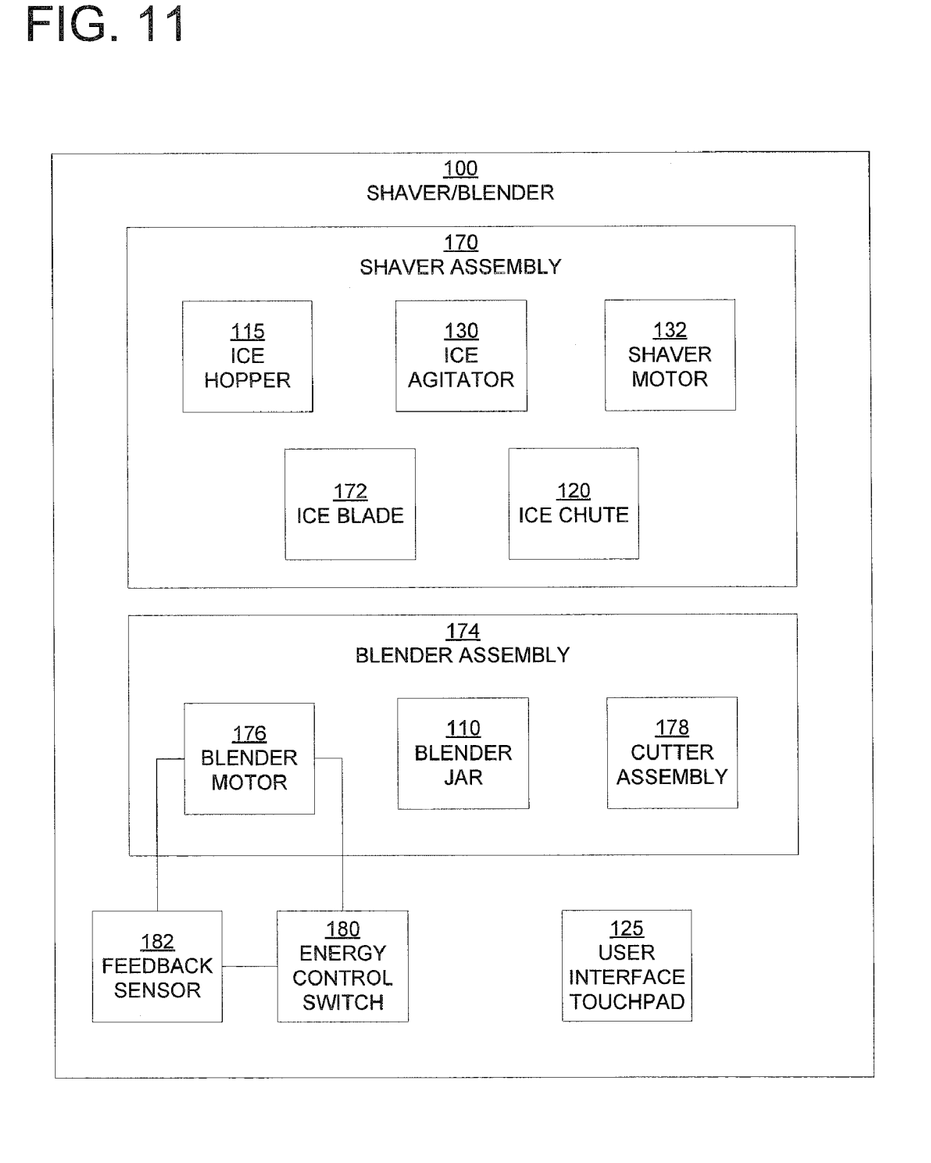
FIG. 11 is a block diagram of an ice shaver/blender assembly.

Turning now to FIG. 11, there is shown a block diagram of an ice shaver/blender of an exemplary embodiment of the invention. The ice shaver/blender assembly 100 comprises a shaver assembly 170, a blender assembly 174, a user interface touchpad 125, an energy control switch 180, and a feedback sensor 182. The shaver assembly 170 comprises an ice hopper 115, an ice agitator 130, an ice shaver 132, an ice chute 120, and an ice blade 172. The blender assembly 174 comprises a blender motor 176, a blender jar 110, and a cutter assembly. As discussed above, the feedback sensor 182 is electrically connected to the energy control switch 180. The feedback sensor 182 is connected to the blender motor 176, mounted proximate the motor, or mounted anywhere in the blender assembly including the motor mount, jar and jar pad.

Operation of the ice shaver/blender is similar to that described earlier with respect to the blender as it relates to the blender component of the shaver/blender. However, there are additional aspects that are specific to the ice shaving component of an ice shaver/blender. At the outset, the portion size and number of portions selected by a user will determine the amount of ice shaved by the ice shaver component. The amount of ice shaved is, in one example, calculated from the number of revolutions of the ice agitator. Therefore, the amount of ice shaved should be consistent as it is relative to the number of times that ice is swept across the blade for shaving during operation. The number of revolutions of the ice agitator may be calculated from a Hall effect sensor that is operatively associated with the shaver motor 132. Other means for determining the number of revolutions of the ice agitator may also be used. Still further, the amount of ice shaved may be determined by other factors than the number of revolutions of an ice agitator. For instance, timed operation of a shaver and measurement of weight of the shaved ice are also known methods for determining and measuring the amount of ice shaved.

It is believed that the calculation of amount of ice shaved is best accomplished by measuring the number of revolutions of the ice agitator. Calculation of the amount of shaved ice by the timed operation of a shaver may yield variable amounts of shaved ice, because the physical operation of shaving the ice itself may slow operation of a shaver. At the very least, the variable speed of the motor caused by the variable ice conditions may result in inconsistent, nonrepeatable amounts of ice shaved. Calculation of the amount of shaved ice by a weight measurement may also result in variable amounts of ice shaved. The measurement means can be vibrated or otherwise subject to abuse given the environment of the shaver/blender. For instance, measurement of an amount of ice shaved in a blender jar can be difficult if the jar is not properly mounted and/or also if the shaving mechanism causes significant vibrations. Contrary to the time and weight based measurements, the counting of revolutions should not be affected by the foregoing environmental factors and should provide more consistent and repeatable results in determining the amount of ice shaved.

Specifically, with respect to the embodiment where the amount of ice shaved is determined based on the number of revolutions of an ice agitator, the amount of ice shaved may be programmed or customized based on variables in the ice shaving process. These variables may include the type of ice being shaved and the environment where the shaver/blender assembly would be used. For instance, in warmer climates, the ice may be relatively soft as compared to cooler or climate controlled locations.

Also, the amount of ice shaved may be varied in a similar fashion as the drink index factor described earlier herein. However, it is also possible that the amount of ice shaved will be directly proportional with the number of portions selected. In other words, there would be a substantially 1:1 ratio between number of portions and amount of ice shaved. However, as indicated, the ratio does not need to be equal in the event of certain types of drinks that might need more or less ice, relatively speaking, than the different numbers of portions of drinks to be blended.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A method of controlling operation of an ice shaver/blender to produce a consistent, blended material comprising the steps of:

providing:
  (a) an ice shaver assembly comprising an ice hopper, an ice agitator that is connected to and rotatably driven by a shaver motor, a blade mounted adjacent the ice agitator, and a shaved ice chute adapted to dispense shaved ice into a blender jar;
  (b) a blender assembly comprising the blender jar and a blender motor operatively connected to a cutter assembly, wherein the cutter assembly is mounted in the blender jar for blending material placed within the jar;
  (c) an energy control switch that activates and controls the amount of energy delivered to the blender motor during operation of the motor; and
  (d) a feedback sensor electrically connected to the energy control switch, wherein the feedback sensor is adapted to detect an attribute associated with the operation of the blender motor and send a signal to the energy control switch based on the attribute detected;

adding ice into the ice shaver;
activating the ice shaver to shave and dispense ice into the blender jar;
adding material to the blender jar;
activating the blender motor;

recording the signal from the feedback sensor to the energy control switch at predetermined time intervals and comparing the signals over time; and deactivating the blender motor when a predetermined relationship is found in the comparison of signals recorded from the feedback sensor.

2. A method as described in claim 1, wherein the predetermined relationship is substantial identicality in the signal recorded from the feedback sensor.

3. A method as described in claim 1, wherein the ice shaver further comprising a rotation sensor for detecting the number of revolutions of the ice agitator; and wherein the step of actuating the shaver motor further comprises detecting the number of revolutions of the ice agitator and deactivating the shaver motor after a predetermined number of revolutions of the ice agitator.

4. A method of operating an ice shaver/blender comprising providing an ice shaver assembly comprising an ice hopper, an ice agitator that is connected to and rotatably driven by a shaver motor, a blade mounted adjacent the ice agitator, and a shaved ice chute adapted to dispense shaved ice into a blender jar;

providing a blender assembly comprising the blender jar and a blender motor operatively connected to a cutter assembly mounted in the blender jar;

providing a user interface operatively connected to the blender motor;

displaying on the user interface a plurality of first selection choices corresponding to predefined portion sizes;

selecting a predefined portion size;

displaying on the user interface a plurality of second selection choices corresponding to a number of portions of material to be blended, each second selection choice corresponding to a different number of portions; and selecting the number of portions of material to be blended.

5. The method described in claim 4, wherein the selecting of a predefined portion size occurs before selecting the number of portions of material to be blended.

6. The method described in claim 4, wherein the predefined portion size corresponds to a type of drink.

7. The method described in claim 4, wherein the portions of material correspond to the number of drinks to be served from the blended material.

8. The method described in claim 4, wherein the portions of material correspond to the amount of ice to be shaved and dispensed into the blender jar.

9. A method of operating an ice shaver/blender comprising providing an ice shaver assembly comprising an ice hopper, an ice agitator that is connected to and rotatably driven by a shaver motor, a blade mounted adjacent the ice agitator, and a shaved ice chute adapted to dispense shaved ice into a blender jar;

providing a blender assembly comprising the blender jar and a blender motor operatively connected to a cutter assembly mounted in the blender jar;

providing a user interface operatively connected to the shaver motor and to the blender motor; and employing a user input, two-step portion blending process comprising:

selecting, via the user interface, a predefined portion size; and selecting the number of portions of material to be blended by pushing one of a plurality of portion selection buttons, each button corresponding to a different portion number.

10. The method described in claim 9, wherein the selecting of a predefined portion size occurs before selecting the number of portions of material to be blended.

11. The method described in claim 9, wherein the predefined portion size corresponds to a type of drink.

12. The method described in claim 9, wherein the portions of material correspond to the number of drinks to be served from the blended material.

13. The method described in claim 9, wherein the portions of material correspond to the amount of ice to be shaved and dispensed into the blender jar.

14. An ice shaver/blender for producing a consistent, blended material, the ice shaver/blender comprising:

(a) an ice shaver assembly comprising an ice hopper, an ice agitator that is connected to and rotatably driven by a shaver motor, a blade mounted adjacent the ice agitator, and a shaved ice chute adapted to dispense shaved ice into a blender jar;

(b) a blender assembly comprising the blender jar and a blender motor operatively connected to a cutter assembly, the cutter assembly mounted in the blender jar for blending material placed within the jar;

(c) an energy control switch that activates and controls the amount of energy delivered to the blender motor during operation of the motor;

(d) a feedback sensor electrically connected to the energy control switch, the feedback sensor adapted to detect an attribute associated with the operation of the blender motor and send a signal to the energy control switch based on the attribute detected; and wherein the energy control switch is adapted to record the signal from the feedback sensor to the energy control switch at predetermined time intervals and comparing the signals over time; and wherein the energy control switch is adapted to deactivate the blender motor when a predetermined relationship is found in the comparison of signals recorded from the feedback sensor.

15. An ice shaver/blender as described in claim 14, wherein the predetermined relationship is substantial identicality in the signal recorded from the feedback sensor.

16. An ice shaver/blender as described in claim 14, wherein the ice shaver assembly further comprises a rotation sensor for detecting the number of revolutions of the ice agitator.

17. An ice shaver/blender comprising:

(a) an ice shaver assembly comprising an ice hopper, an ice agitator that is connected to and rotatably driven by a shaver motor, a blade mounted adjacent the ice agitator, and a shaved ice chute adapted to dispense shaved ice into a blender jar;

(b) a blender assembly comprising the blender jar and a blender motor operatively connected to a cutter assembly mounted in the blender jar; and (c) a user interface operatively connected to the blender motor, the user interface adapted to display a plurality of first selection choices corresponding to predefined portion sizes, the user interface further adapted to receive a user selection of a predefined portion size, the user interface further adapted to display a plurality of second selection choices corresponding to a number of portions of material to be blended, each second selection choice corresponding to a different number of portions, and the user interface further adapted to receive a user selection of the number of portions of material to be blended.

18. The ice shaver/blender described in claim 17, wherein the user interface is adapted to receive a user selection of a predefined portion size before receiving a user selection of the number of portions of material to be blended.

19. The ice shaver/blender described in claim 17, wherein the predefined portion size corresponds to a type of drink.

20. The ice shaver/blender described in claim 17, wherein the portions of material correspond to the number of drinks to be served from the blended material.

21. The ice shaver/blender described in claim 17, wherein the portions of material correspond to the amount of ice to be shaved and dispensed into the blender jar.

22. A blender comprising:
- a blender assembly comprising a blender jar and a blender motor operatively connected to a cutter assembly mounted in the blender jar; and
- a user interface operatively connected to the blender motor, the user interface adapted to employ a user input, two-step portion blending process by receiving a user selection of a predefined blender cycle and a user selection of a number of portions of material to be blended;
- wherein the user selects the number of portions by pushing one of a plurality of portion selection buttons, each button corresponding to a different portion number.

23. The blender described in claim 22, wherein the user interface is adapted to receive the user selection of the predefined blender cycle before receiving the user selection of the number of portions of material to be blended.

24. The blender described in claim 22, wherein the predefined blender cycles correspond to different types of drinks.

25. The blender described in claim 22, wherein the portions of material correspond to the number of drinks to be served from the blended material.

26. An ice shaver/blender comprising
- an ice shaver assembly comprising an ice hopper, an ice agitator that is connected to and rotatably driven by a shaver motor, a blade mounted adjacent the ice agitator, and a shaved ice chute adapted to dispense shaved ice into a blender jar;
- a blender assembly comprising the blender jar and a blender motor operatively connected to a cutter assembly mounted in the blender jar; and
- a user interface operatively connected to the shaver motor and to the blender motor, the user interface adapted to employ a user input, two-step portion blending process by receiving a user selection of a predefined portion size and a user selection of a number of portions of material to be blended, the user selection of the number of portions of material to be blended being received via one of a plurality of portion selection buttons, each button corresponding to a different portion number.

27. The ice shaver/blender described in claim 26, wherein the user interface is adapted to receive the selection of the predefined portion size before receiving the selection of the number of portions of material to be blended.

28. The ice shaver/blender described in claim 26, wherein the predefined portion size corresponds to a type of drink.

29. The ice shaver/blender described in claim 26, wherein the portions of material correspond to the number of drinks to be served from the blended material.

30. The ice shaver/blender described in claim 26, wherein the portions of material correspond to the amount of ice to be shaved and dispensed into the blender jar.

* * * * *